United States Patent
Hong (10) Patent No.: US 9,592,793 B2
(45) Date of Patent: Mar. 14, 2017

(54) METHOD AND SYSTEM FOR PREVENTING TELEMATICS REMOTE CONTROL VEHICLE FROM BEING EXTERNALLY HACKED

(71) Applicant: Hyundai Motor Company, Seoul (KR)

(72) Inventor: Jeung Sik Hong, Seoul (KR)

(73) Assignee: Hyundai Motor Company, Seoul (KR)

( * ) Notice: Subject to any disclaimer, the term of this patent is extended or adjusted under 35 U.S.C. 154(b) by 53 days.

(21) Appl. No.: 14/317,989

(22) Filed: Jun. 27, 2014

(65) Prior Publication Data

US 2015/0166007 A1  Jun. 18, 2015

(30) Foreign Application Priority Data

Dec. 16, 2013  (KR) .................. 10-2013-0156673

(51) Int. Cl.
*B60R 25/10*  (2013.01)

(52) U.S. Cl.
CPC .................... *B60R 25/10* (2013.01)

(58) Field of Classification Search
CPC ......... B60R 25/01; B60R 25/10; B60R 25/20; B60R 25/23–25/243; B60R 25/248; B60R 2325/20; H04W 12/00; H04W 12/06–12/12; G06F 21/30; G06F 21/31; G06F 21/44–21/445; G06F 21/55; G06F 21/70–21/71; G06F 21/73
USPC ............... 701/2, 36, 48, 29.6, 31.5; 340/5.8; 726/2–5, 26–28, 30; 455/410–411
See application file for complete search history.

(56) References Cited

U.S. PATENT DOCUMENTS

| | | | |
|---|---|---|---|
| 2006/0061458 A1* | 3/2006 | Simon | B60R 25/04 340/426.35 |
| 2012/0254948 A1* | 10/2012 | Kleve | H04L 9/3215 726/4 |
| 2013/0227648 A1* | 8/2013 | Ricci | H04W 12/08 726/3 |
| 2013/0317693 A1* | 11/2013 | Jefferies | G07B 15/00 701/31.5 |
| 2014/0129053 A1* | 5/2014 | Kleve | B60R 25/24 701/2 |
| 2014/0303837 A1* | 10/2014 | Tuukkanen | G06Q 10/02 701/36 |
| 2014/0343755 A1* | 11/2014 | Rasal | B60R 25/209 701/2 |

(Continued)

FOREIGN PATENT DOCUMENTS

| | | |
|---|---|---|
| JP | 2013-132912 A | 7/2013 |
| KR | 10-00156073 B1 | 7/1998 |

(Continued)

*Primary Examiner* — Bao Long T Nguyen
(74) *Attorney, Agent, or Firm* — McDermott Will & Emery LLP (57) ABSTRACT

A method for preventing a telematics remote control vehicle from being externally hacked includes receiving a remote control command by a telematics multimedia unit (TMU). When the remote control command is received, whether the remote control command is appropriate or not is determined by the TMU. When the remote control command is appropriate the remote control command is transmitted to a corresponding device by the TMU. When the remote control command is not appropriate, an internal device related to transception of the remote control command is reset and initialized by the TMU.

6 Claims, 6 Drawing Sheets

(56) References Cited

U.S. PATENT DOCUMENTS

2015/0121482 A1* 4/2015 Berman ............... H04L 63/10
726/5

FOREIGN PATENT DOCUMENTS

| KR | 10-2003-0004303 A | 1/2003 |
| KR | 10-2006-0063565 A | 6/2006 |
| KR | 10-2008-0055363 A | 6/2008 |
| KR | 2013-0068562 A | 6/2013 |

* cited by examiner

| PIN code | Performable remote control |
|---|---|
| 01121-23115 | Remote starting |
| 00231-91612 | Air conditioning control |
| 70214-45465 | Open/close door |
| 81203-70521 | Search vehicle(Horn/Hazard) |
| ... | ... |

METHOD AND SYSTEM FOR PREVENTING TELEMATICS REMOTE CONTROL VEHICLE FROM BEING EXTERNALLY HACKED

CROSS-REFERENCE TO RELATED APPLICATION

This application claims the benefit of priority to Korean Patent Application No. 10-2013-0156673 filed in the Korean Intellectual Property Office on Dec. 16, 2013, the entire contents of which are incorporated herein by reference.

TECHNICAL FIELD

The present disclosure relates to a method and a system for preventing a telematics remote control vehicle from being externally hacked, which prevent danger of vehicle security from being hacked by an external third element that arbitrarily controls a vehicle, in which a telematics multimedia unit (TMU) for performing a remote control by using a vehicle network is mounted, by using the network.

BACKGROUND

As is well known to those skilled in the art, as telematics is developed and applied to a vehicle, the vehicle communicates with users outside the vehicle through an external wired/wireless communication network. The users outside the vehicle may monitor a state of the vehicle and control the vehicle from the outside before getting in the vehicle through the telematics.

As described above, telematics provides much convenience in using the vehicle, but has a risk that an external incorrect user (hacker) may illegally access the vehicle. Accordingly, considerable security is demanded in the vehicle to which the telematics is applied.

In the related art, a scope of the vehicle security focuses on security of the vehicle itself, such as a door key, an indoor movement detection device, and immobilization. In the telematics field, security of a telematics server (or center), security authentication of a mobile terminal (for example, a smart phone) and the like have been developed and applied to the vehicle.

However, data channels, which general users commonly access when the general users pay their communication charges for a general wireless network, are currently opened, and a security level of a Wi-Fi zone and the like of the vehicle is still a level of a general Wi-Fi zone, so that the security still has vulnerability. That is, a range of vehicle control for a telematics service is at a light level (less than about 2% of the entire vehicle control) when considering messages transceived for several control periods in the vehicle itself.

However, the TMU is connected with several networks of the vehicle, for example, an engine controller, a body controller, a chassis controller, and a CAN, for controlling the vehicle and collecting vehicle information. Accordingly, it is concerned that vehicle network security can be hacked by an external third element.

Figure 1:
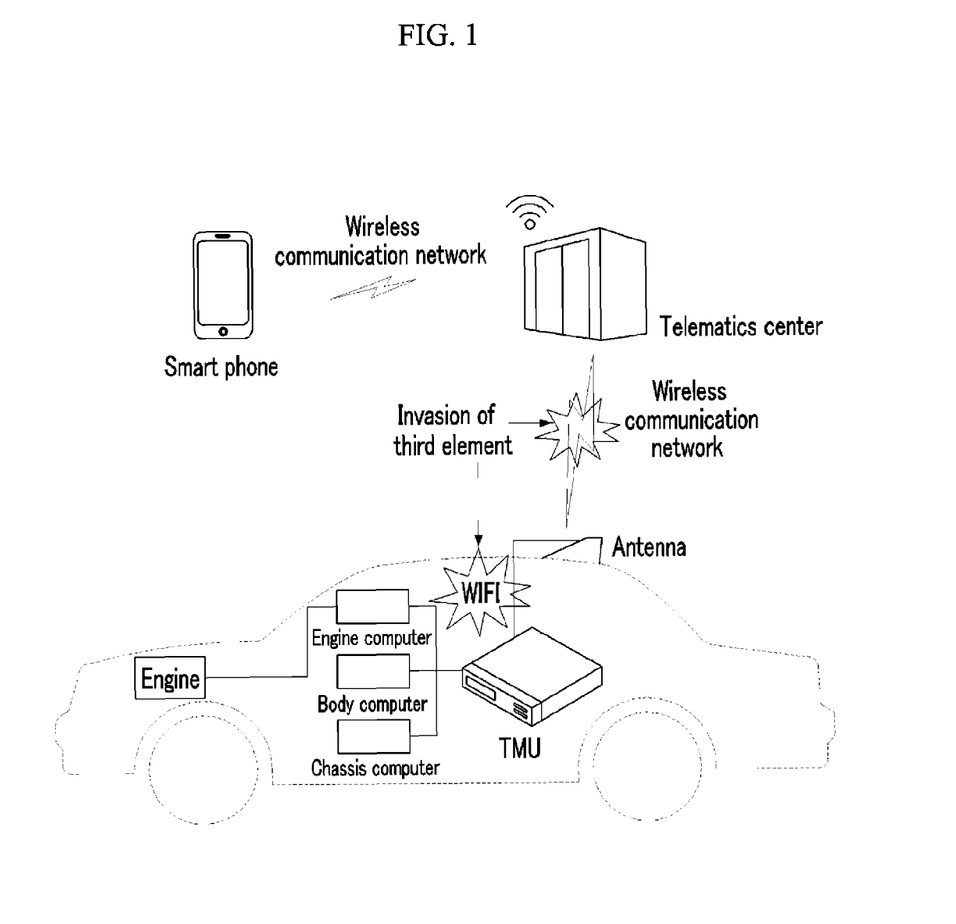
FIG. 1 is a diagram illustrating an example of external hacking of a telematics remote control vehicle.

As an intrusion path from the outside, as illustrated in FIG. 1, there is a high possibility of a direct intrusion from an element, other than a mobile terminal (smart phone) and the telematics center among constituent elements of the telematics, to the vehicle. Examples of the direct intrusion may include an intrusion using a wireless network between the telematics center and the vehicle and an intrusion through Wi-Fi of the vehicle.

The above information disclosed in this Background section is only for enhancement of understanding of the background of the disclosure, and therefore, it may contain information that does not form the prior art that is already known in this country to a person of ordinary skill in the art.

SUMMARY

The present disclosure provides a method and a system for preventing a telematics remote control vehicle from being externally hacked. The method and system prevent danger of vehicle security from being hacked by an external third element that arbitrarily controls a vehicle, in which a telematics multimedia unit (TMU) for performing a remote control by using a vehicle network is mounted, by using the network.

An exemplary embodiment of the present invention provides a method of preventing a telematics remote control vehicle from being externally hacked. The method includes receiving, by a telematics multimedia unit (TMU), a remote control command. When the remote control command is received, whether or not the remote control command is appropriate is determined by the TMU. When the remote control command is appropriate, the remote control command is transmitted by the TMU to a corresponding device. When the remote control command is not appropriate, an internal device related to transception of the remote control command is reset and initialized by the TMU.

Whether or not the remote control command is appropriate may be determined by a microcomputer of the TMU, and the remote control command may be received by a central processing unit (CPU) of the TMU and transmitted to the microcomputer.

The internal device may include at least one of a power module, a modem module, a WiFi module, and the CPU.

The remote control command may include controller area network (CAN) communication data, and a command for resetting and initializing the internal device may be generated by the microcomputer.

Determination data for determining whether the remote control command is appropriate may be set through communication with a telematics server.

The determination data may be variably set.

The set determination data may be changed by inputting change determination data transmitted from the telematics server through an input device of the vehicle.

The input device may be a touch screen of an audio video navigation (AVN).

The CPU may be wirelessly programmable.

Another exemplary embodiment of the present invention provides a system for preventing a telematics remote control vehicle from being externally hacked. The system includes a telematics server configured to manage information and data related to a remote control of a vehicle. A telematics multimedia unit (TMU) is installed in the vehicle and configured to communicate with the telematics server. A plurality of vehicle control devices are installed in the vehicle, connected with the TMU through a CAN communication network, and configured to control corresponding devices. The TMU is operated by a program stored for performing the method according to an exemplary embodiment of the present invention.

As described above, according to the exemplary embodiment of the present invention, it is possible to fundamentally prevent an external third element from arbitrarily controlling the vehicle, in which the TMU performing a remote control by using the vehicle network is mounted, by using the network.

Further, according to the exemplary embodiment of the present invention, even though external hackers enter the vehicle by illegally accessing a vehicle network through a wireless network (modem, WiFi, and the like) using a characteristic of wireless network connection of the telematics, and breaking all of security of front terminals of a smart phone, a center, and a wireless network for controlling a plurality of vehicle controllers connected to the network, a final terminal may prevent a command from being transmitted, thereby improving security of the vehicle.

DETAILED DESCRIPTION OF THE EMBODIMENTS

The present disclosure will be described more fully hereinafter with reference to the accompanying drawings, in which exemplary embodiments of the disclosure are shown. As those skilled in the art would realize, the described embodiments may be modified in various different ways, all without departing from the spirit or scope of the present disclosure.

In addition, throughout the specification, unless explicitly described to the contrary, the word "comprise" and variations such as "comprises" or "comprising" will be understood to imply the inclusion of stated elements but not the exclusion of any other elements.

Figure 2:
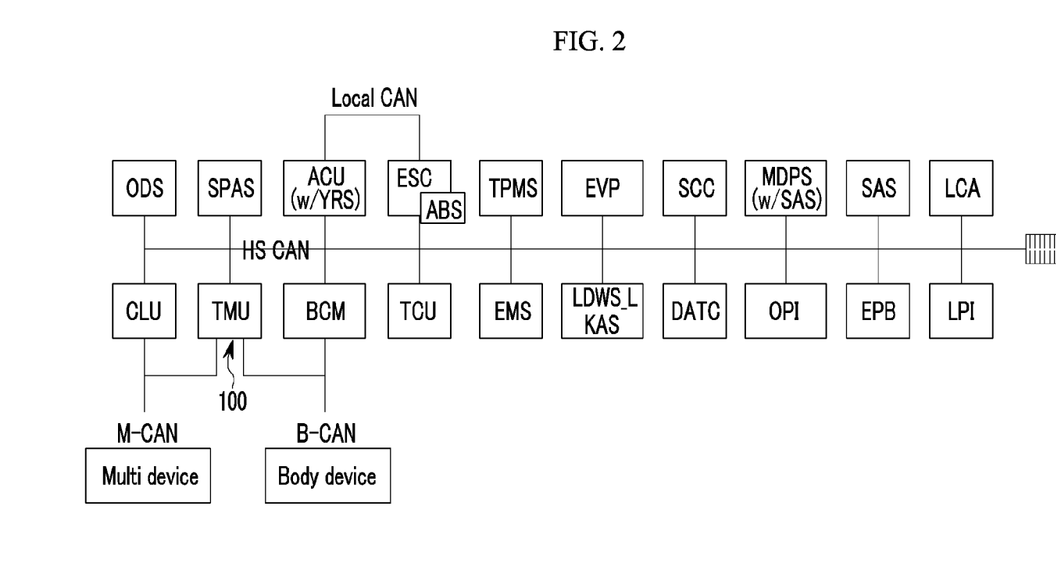
FIG. 2 is a diagram illustrating an example of a vehicle network of a telematics remote control vehicle to which the present disclosure is applied.
Figure 3:
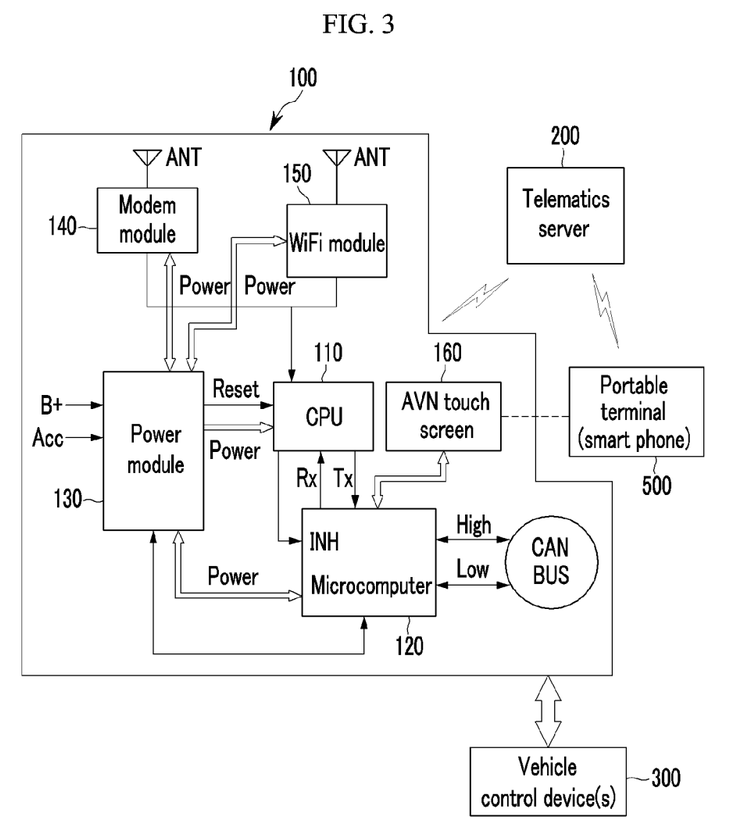
FIG. 3 is a configuration diagram illustrating an external hacking preventing system of a telematics remote control vehicle according to an exemplary embodiment of the present invention.

FIG. 2 is a diagram illustrating an example of a vehicle network of a telematics remote control vehicle to which an exemplary embodiment of the present invention is applied. Referring to FIG. 2, a telematics multimedia unit (TMU) 100 according to an exemplary embodiment of the present invention forms a network with a battery control module (BCM), a traction control unit (TCU), an engine management system (EMS), and the like through controller area network (CAN) communication. The vehicle network illustrated in FIG. 2 may be a vehicle network known in the related art. FIG. 3 is a diagram schematically illustrating an external hacking preventing system of a telematics remote control vehicle according to an exemplary embodiment of the present invention.

The external hacking preventing system of the telematics remote control vehicle according to an exemplary embodiment of the present invention is a system for preventing an external third element from arbitrarily controlling a vehicle, in which the TMU is mounted, by using a network. The external hacking preventing system of the telematics remote control vehicle according to an exemplary embodiment of the present invention may include a telematics server 200 for managing information and data related to a remote control of the vehicle. A TMU 100 is installed in the vehicle and communicates with the telematics server 200. A plurality of vehicle control devices 300 are installed in the vehicle, connected with the TMU 100 through a CAN communication network, and control corresponding devices.

The telematics server 200 may be an existing server installed in a telematics center.

The plurality of vehicle control devices 300 may include the BCM, the TMU, the EMS, and the like as illustrated in FIG. 2.

The TMU 100 may include a modem module 140, a Wi-Fi module 150, a power module 130, a central processing unit (CPU) 110, a microcomputer 120 (hereinafter, abbreviated as a "micom"), and a touch screen 160.

The modem module 140, the WiFi module 150, the power module 130, and the touch screen 160 may be a modem module, a Wi-Fi module, a power module, and a touch screen that are applied in the related art.

The CPU 110 and/or the micom 120 of the TMU 100 are operated by a preset program, and the preset program may be configured of a series of commands for performing an external hacking preventing method of the telematics remote control vehicle according to an exemplary embodiment of the present invention, which will be described below, as well as an existing method of performing the telematics function. The CPU 110 may be wirelessly programmable. The micom 120 is programmed in the vehicle by other than a wireless method.

Hereinafter, an external hacking preventing method of the telematics remote control vehicle according to an exemplary embodiment of the present invention will be described in detail with reference to the accompanying drawings.

Figure 4:
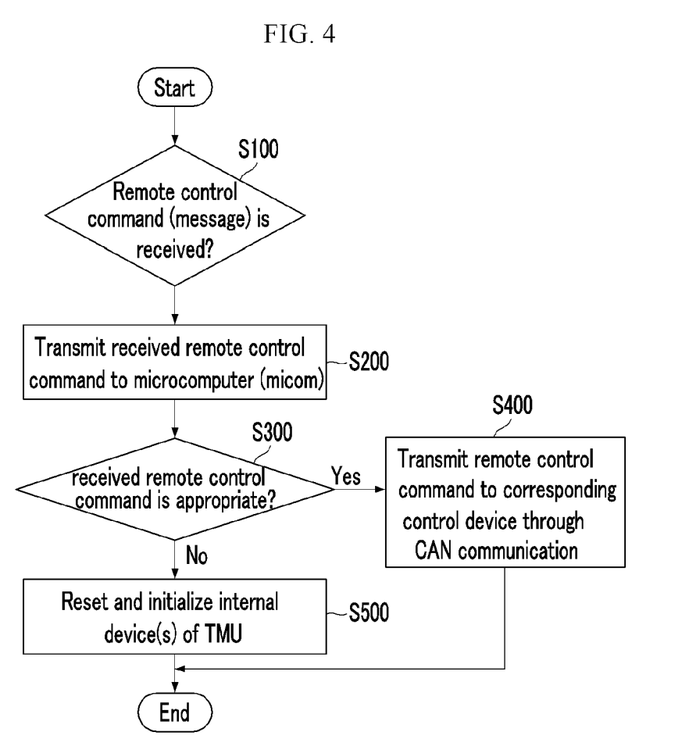
FIG. 4 is a flowchart illustrating an external hacking preventing method of a telematics remote control vehicle according to an exemplary embodiment of the present invention.

FIG. 4 is a flowchart illustrating an external hacking preventing method of the telematics remote control vehicle according to an exemplary embodiment of the present invention. As illustrated in FIG. 4, the CPU 110 of the TMU 100 checks whether a remote control command (or message) is received through the modem module 140 or the Wi-Fi module 150 (S100). When the remote control command is received in step S100, the CPU 110 transmits the remote control command to the micom 120 of the TMU 100 (S200). When the remote control command is received, the micom 120 determines whether the received remote control command is appropriate (S300). Determination data for determining appropriateness of the remote control command is set through communication with the telematics server 200.

Figure 5:
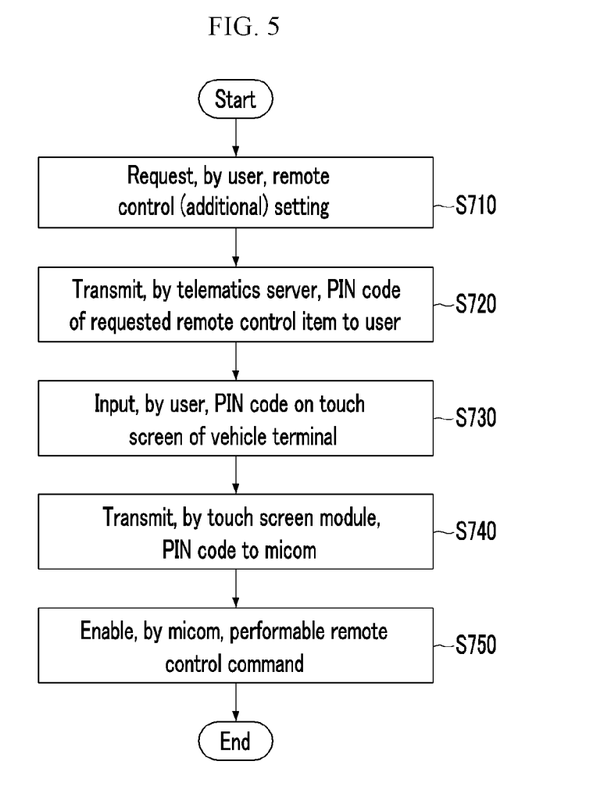
FIG. 5 is a flowchart for setting a PIN code of an external hacking preventing method of the telematics remote control vehicle according to an exemplary embodiment of the present invention.

For example, referring to FIG. 5, when a user requests remote control setting and/or remote control additional setting from the telematics server 200 through the TMU 100 (S710), the telematics server 200 transmits a PIN code for a requested remote control item to a portable terminal (for example, a smart phone) 500 of the user (S720). When the PIN code is transmitted to the portable terminal 500, the user inputs the received PIN code through an input device of the vehicle, for example, the touch screen 160 of an audio video navigation (AVN) (S730). When the PIN code is input into the touch screen 160, the input PIN code is transmitted and stored in the micom 120 (S740). The stored PIN code becomes a PIN code performable by the micom 120, and the PIN code is used for determining appropriateness of the remote control command (S750).

Figure 6:
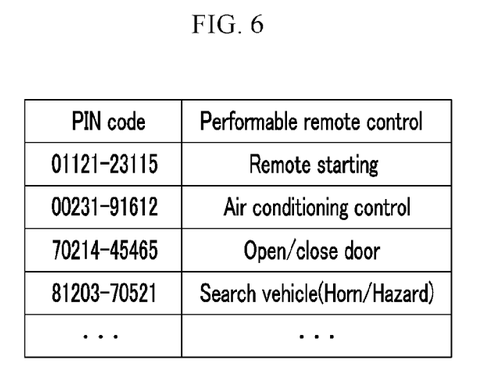
FIG. 6 is a diagram illustrating an example of the PIN code according to an exemplary embodiment of the present invention.

FIG. 6 illustrates an exemplary embodiment of the PIN code performable by the micom 120. In the exemplary embodiment of the present invention, the setting of the PIN code is not terminated at a time, but may be variably and randomly performed as necessary.

When it is determined that the remote control command is appropriate in step S300, the micom 120 transmits the remote control command to the corresponding control device 300 through the CAN communication, and makes the corresponding devices be controlled in a manner desired by the user (S400). When it is determined that the remote control command is not appropriate in step S300, the micom 120 resets and/or initializes internal devices related to transception of the remote control command, for example, the power module 130, the modem module 140, the Wi-Fi module 150, and/or the CPU 110, which are illustrated in FIG. 3, and ignores the inappropriate remote control command (S500).

After step S500, the micom 120 re-installs an initial program in the CPU 110, the modem module 140, and/or the WiFi module 150, into which the inappropriate remote control command is input, to make the TCU 100 be normally operated. When the micom 120 transmits a command for resetting and initializing the power module 130, the modem module 140, the Wi-Fi module 150, and/or the CPU 110 to the power module 130, the power module 130 may initialize and reset the modem module 140, the Wi-Fi module 150, and/or the CPU 110 in step S500.

Accordingly in the exemplary embodiment of the present invention, it is possible to prevent an external third element from arbitrarily controlling the vehicle, in which the TMU performing a remote control by using the vehicle network is mounted, by using the network.

While this disclosure has been described in connection with what is presently considered to be practical exemplary embodiments, it is to be understood that the disclosure is not limited to the disclosed embodiments, but, on the contrary, is intended to cover various modifications and equivalent arrangements included within the spirit and scope of the appended claims.

What is claimed is:

1. A method of preventing a telematics remote control vehicle from being externally hacked, the method comprising steps of:
  receiving, by a telematics multimedia unit (TMU), a remote control command;
  determining, by the TMU, whether the remote control command is appropriate when the remote control command is received;
  transmitting, by the TMU, the remote control command to a corresponding device when the remote control command is appropriate; and
  resetting and initializing, by the TMU, an internal device related to transmitting or receiving of the remote control command when the remote control command is not appropriate,
  wherein determination data for determining whether the remote control command is appropriate or not is set through communication with a telematics server,
  wherein the determination data is variably set,
  wherein the set determination data is changed by inputting changed determination data transmitted from the telematics server through an input device of the vehicle, and wherein the step of determining includes:
  receiving a request of a remote control setting from a user;
  transmitting a PIN (Personal Identification Number) code for the remote control setting to a portable terminal of the user;
  storing the PIN code which is input through a touch screen of an audio video navigation (AVN); and
  determining appropriateness of the remote control command by using the stored PIN code.

2. The method of claim 1, wherein:
  whether the remote control command is appropriate or not is determined by a microcomputer of the TMU, and the remote control command is received by a central processing unit (CPU) of the TMU and transmitted to the microcomputer.

3. The method of claim 2, wherein:
  the internal device includes at least one of a power module, a modem module, a Wi-Fi module, and the CPU.

4. The method of claim 2, wherein:
  the remote control command includes controller area network (CAN) communication data, and a command for resetting and initializing the internal device is generated by the microcomputer.

5. The method of claim 2, wherein:
  the CPU is wirelessly programmable.

6. A system for preventing a telematics remote control vehicle from being externally hacked, the system comprising:
  a telematics server configured to manage information and data related to a remote control of a vehicle;
  a telematics multimedia unit (TMU) installed in the vehicle and configured to communicate with the telematics server; and
  a plurality of vehicle control devices installed in the vehicle, connected with the TMU through a CAN communication network, and configured to control corresponding devices,
  wherein the TMU is operated by a stored program configured for performing a method comprising:
  receiving a remote control command;
  determining whether the remote control command is appropriate when the remote control command is received;
  transmitting the remote control command to a corresponding device when the remote control command is appropriate; and
  resetting and initializing an internal device related to transmitting or receiving of the remote control command when the remote control command is not appropriate,
  wherein determination data for determining whether the remote control command is appropriate or not is set through communication with the telematics server,
  wherein the determination data is variably set,
  wherein the set determination data is changed by inputting changed determination data transmitted from the telematics server through an input device of the vehicle,
  wherein the step of determining includes:
  receiving a request of a remote control setting from a user;
  transmitting a PIN (Personal Identification Number) code for the remote control setting to a portable terminal of the user;
  storing the PIN code which is input through a touch screen of an audio video navigation (AVN); and determining appropriateness of the remote control command by using the stored PIN code.

\* \* \* \* \*